(12) United States Patent
Lee et al.

(10) Patent No.: US 8,220,122 B2
(45) Date of Patent: Jul. 17, 2012

(54) DOOR HINGE MOUNTING DEVICE

(75) Inventors: Hyun Jin Lee, Gyeonggi-do (KR); In Ho Jeong, Ulsan (KR)

(73) Assignee: Hyundai Motor Company, Seoul (KR)

( * ) Notice: Subject to any disclaimer, the term of this patent is extended or adjusted under 35 U.S.C. 154(b) by 861 days.

(21) Appl. No.: 12/329,667

(22) Filed: Dec. 8, 2008

(65) Prior Publication Data
US 2009/0265888 A1    Oct. 29, 2009

(30) Foreign Application Priority Data

Apr. 28, 2008  (KR) .......................... 10-2008-0039486

(51) Int. Cl.
*B23P 19/04* (2006.01)

(52) U.S. Cl. ......................................... 29/283; 29/283.5

(58) Field of Classification Search .................. 29/281.1, 29/281.5, 283, 283.5, 281.6; 269/37, 905; 16/252
See application file for complete search history.

(56) References Cited

U.S. PATENT DOCUMENTS

| | | | | |
|---|---|---|---|---|
| 2,122,007 A * | 6/1938 | Kearney | ............................ | 16/252 |
| 4,589,199 A * | 5/1986 | Ohtaki et al. | .................... | 29/714 |
| 4,616,411 A * | 10/1986 | Suzuki et al. | .................... | 29/822 |
| 4,907,331 A * | 3/1990 | Kaibuki et al. | ............... | 29/213.1 |
| 5,040,290 A * | 8/1991 | Usui et al. | ........................ | 29/787 |
| 5,181,307 A * | 1/1993 | Kitahama et al. | ................ | 29/434 |
| 5,644,817 A * | 7/1997 | Bender et al. | .................... | 16/382 |
| 6,122,813 A * | 9/2000 | Roy et al. | .................... | 29/407.09 |
| 6,311,382 B1 * | 11/2001 | Jack | ................................ | 29/464 |
| 6,910,254 B2 * | 6/2005 | Aoki et al. | ........................ | 29/464 |
| 7,036,210 B2 * | 5/2006 | Jung | ................................ | 29/714 |

FOREIGN PATENT DOCUMENTS

| | | |
|---|---|---|
| JP | 64-067486 | 3/1989 |
| KR | 10-0737008 | 7/2007 |

* cited by examiner

*Primary Examiner* — Lee D Wilson
(74) *Attorney, Agent, or Firm* — Edwards Wildman Palmer LLP; Peter F. Corless

(57) ABSTRACT

A door hinge mounting device according to an exemplary embodiment of the present invention includes: a jig frame; upper and lower door hinge arranging units disposed to a rearward side of the jig frame corresponding to positions of hinge mounting portions of a vehicle body for arranging upper and lower door hinges; upper and lower door hinge clamping units disposed to a forward side of the jig frame corresponding to positions of the upper and lower door hinge arranging units for clamping the door hinges; a support unit disposed near the lower door hinge clamping unit for closely adhering the jig frame to the vehicle body; and a fixing unit disposed to the forward side of the jig frame between the upper door hinge clamping unit and the support unit for fixing the jig frame to the vehicle body.

20 Claims, 12 Drawing Sheets

DOOR HINGE MOUNTING DEVICE

CROSS-REFERENCE TO RELATED APPLICATION

This application claims priority to and the benefit of Korean Patent Application No. 10-2008-0039486 filed on Apr. 28, 2008, the entire contents of which are incorporated herein by reference.

BACKGROUND (a) Technical Field

The present invention relates to a door hinge mounting device for mounting a door hinge to a pillar of a side outer panel of a vehicle.

(b) Background Art

Generally, in a door mounting process of a vehicle body manufacturing line, door hinges are mounted to upper and lower pillars of a side panel and then a door is mounted to the door hinges.

In the door hinge mounting process, when a vehicle body is conveyed to a manufacturing line, door hinges are closely adhered to door hinge mounting portions of upper and lower parts of forward and rearward pillars and then the door hinges are connected to the door hinge mounting portions with a tool.

That is, a worker grips the door hinges with one hand and mounts the door hinges to the door hinge mounting portions by the tool with the other hand.

However, procedures for mounting the door hinges to door hinge mounting portions remain manual so that positions of mounting the door hinges can be inconsistent.

Thus, productivity may be deteriorated and aesthetical features of the doors are also deteriorated.

In general, the manual processes cause variable quality according to experience of the worker.

The above information disclosed in this Background section is only for enhancement of understanding of the background of the invention and therefore it may contain information that does not form the prior art that is already known in this country to a person of ordinary skill in the art.

SUMMARY

In one aspect, the present invention provides a door hinge mounting device including a jig frame, upper and lower door hinge arranging units, upper and lower door hinge clamping units, a support unit and a fixing unit.

The upper and lower door hinge arranging units are disposed to a rearward side of the jig frame corresponding to positions of hinge mounting portions of a vehicle body for arranging upper and lower door hinges. The upper and lower door hinge clamping units are disposed to a forward side of the jig frame corresponding to positions of the upper and lower door hinge arranging units for clamping the door hinges. The support unit is disposed near the lower door hinge clamping unit for closely adhering the jig frame to the vehicle body. The fixing unit is disposed to the forward side of the jig frame between the upper door hinge clamping unit and the support unit for fixing the jig frame to the vehicle body.

Preferably, the upper door arranging unit may be configured such that a positioning protrusion formed to a vehicle body hinge plate of the upper door hinge can be inserted to a positioning hole formed to the door hinge mounting portion for arranging the upper door hinge. In this case, the positioning protrusion inserted into the positioning hole may act as reference position of the jig frame for the vehicle body.

Preferably, the fixing unit may comprise: a holder that comprises a hollow and is disposed forward to the jig frame; a shaft that is rotatably disposed in the hollow and comprises a lever that is formed to an end of the shaft and a supporting protrusion that is formed the shaft; a spring disposed in the hollow and supplying elastic force to the supporting protrusion; and a fixing plate that is formed to the other end of the shaft and is selectively inserted into a slot hole that is formed to the vehicle body.

Preferably, the support unit may comprise: a fixing block disposed forward to the jig frame corresponding to a position of a pillar of the vehicle body; a location arm that is movably disposed to the fixing block to forward and rearward of the vehicle body and adhered closely to the pillar of the vehicle body; and a first fixing bolt that is screwed to the fixing block for fixing the location arm. In this case, the support unit may further comprise a circle unit that is connected to the location arm and is slidably disposed within a guide groove that is formed in the fixing block; a cover plate for covering the guide groove; and an adjusting bolt that is screwed with the cover plate and adjusts a position of the circle unit. Further, the location arm may comprise: a longitudinal beam that is formed along the front and rear of the vehicle body corresponding to the pillar; a perpendicular beam formed to both ends of the longitudinal beam; and a supporting pad mounted to the perpendicular beam corresponding to the pillar. Here, a connecting portion may be eccentrically disposed to the longitudinal beam and connected with the circle unit by the second fixing bolt.

Preferably, the upper and lower door hinge arranging units each may comprise: first brackets that are mounted to upper and lower sides of the jig frame; a first toggle lever that is hingedly connected to each of the first brackets; a first link that is hingedly connected to the first toggle lever; an operating rod that is hingedly connected to the first link and moves forward and rearward of the vehicle body according to an operation of the first toggle lever; a moving plate connected with the operating rod; and an arranging pin that is mounted to the moving plate and can be inserted into a bolt hole, which is formed to a door hinge plate, through the jig frame.

Preferably, each of the upper and lower door hinge clamping units may be a toggle clamp.

Preferably, the upper and lower door hinge clamping units each may comprise: second brackets that are mounted to upper and lower forward sides of the jig frame corresponding to the door hinge plates arranged by the door hinge arranging units; second toggle levers that are rotatably connected with the second brackets and connected to each other by a connecting member; a second link that is hingedly connected to each of the second toggle levers and each of the second brackets; a pivoting element that is hingedly connected to each of the second toggle levers and each of the second brackets; and a clamper that is connected with the pivoting element for clamping a corresponding door hinge plate. In this case, the clamper may clamp the door hinge plate with the bolt hole center centered. Here, an arranging protrusion may be formed to the clamper for clamping the vehicle body hinge plate.

Preferably, a grip may be mounted to the jig frame.

Preferably, the upper hinge clamping unit may be configured such that a positioning protrusion formed to a vehicle body hinge plate corresponding to the upper door hinge mounting portion can be inserted into a positioning hole formed to the door hinge mounting portion for clamping the upper door hinge. In this case, the positioning protrusion inserted into the positioning hole may act as reference position of the jig frame for the vehicle body.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

While the drawings are described in connection with what is presently considered to be practical exemplary embodiments, it is to be understood that the invention is not limited to the disclosed drawings.

Figure 1:
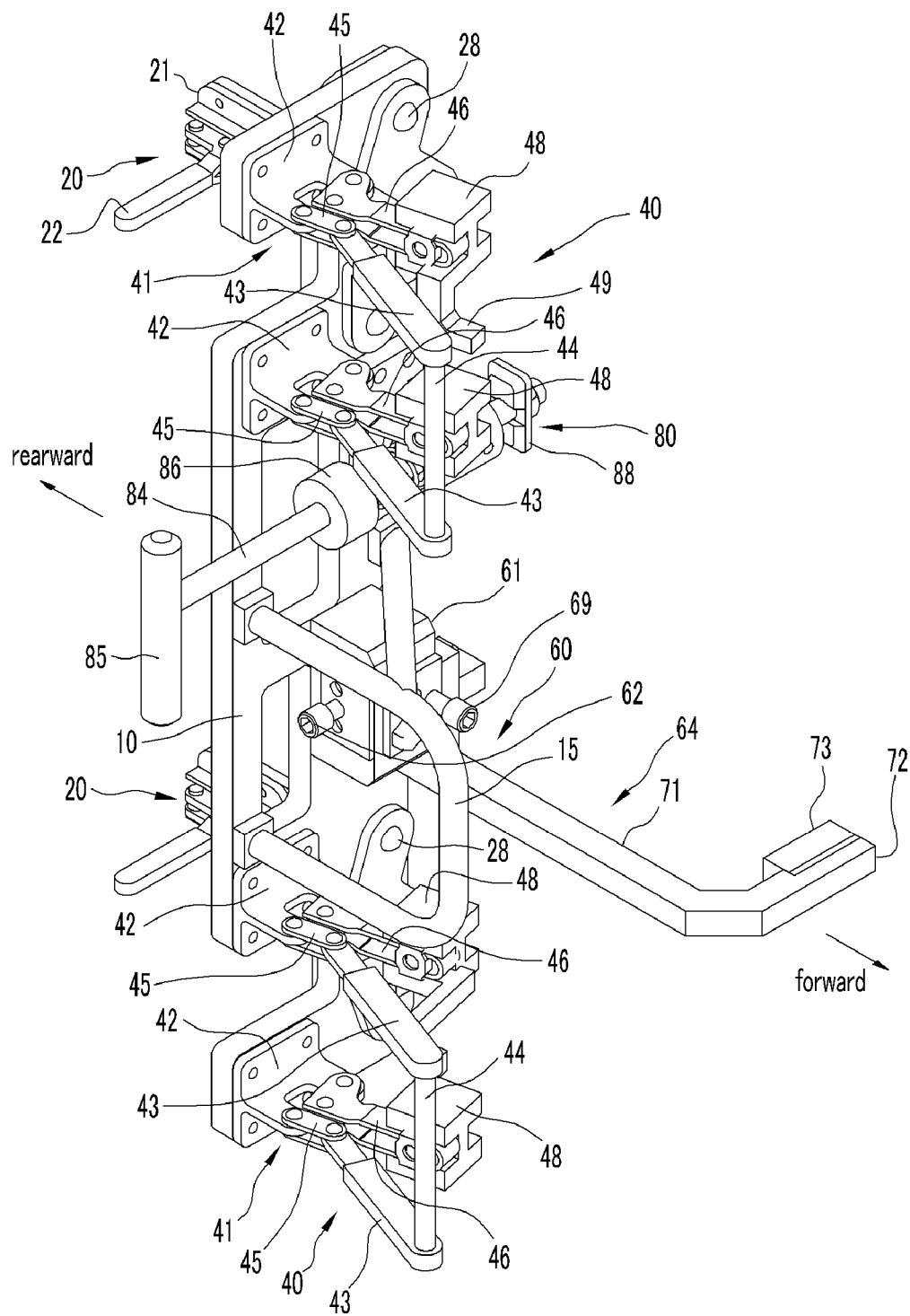
FIG. 1 is a perspective view of a door hinge mounting device according to an exemplary embodiment of the present invention.

Reference numerals set forth in the Drawings includes reference to the following elements as further discussed below:

10: jig frame
15: grip
20: door hinge arranging unit
21: first bracket
22: the first toggle lever
23: the first link
24: operating rod
26: moving plate
28: arranging pin
29: mounting plate
40: door hinge clamping unit
41: toggle clamp
42: the second bracket
43: the second toggle lever
44: connecting member
45: the second link
46: pivoting element
48: clamper
49: arranging protrusion
60: support unit
61: fixing block
62: first fixing bolt
63: guide groove
64: location arm
66: second fixing bolt
67: circle unit
68: cover plate
69: adjusting bolt
71: longitudinal beam
72: perpendicular beam
73: supporting pad
74: connecting portion
80: fixing unit
81: holder
82: hollow
84: shaft
85: gripping lever
86: supporting protrusion
87: spring
88: fixing plate
100: mounting device
110: upper door hinge
120: lower door hinge
111: hinge pin
113: door hinge plate
114,124: first hinge bolt hole
115,125: vehicle body hinge plate
116,126: second hinge bolt hole
117,127: positioning protrusion
130: vehicle body
131: side outer panel
133: forward pillar
135: rearward pillar
139: slot hole
150: upper door hinge mounting portion
160: lower door hinge mounting portion
151: vehicle body bolt hole
153: positioning hole

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 2:
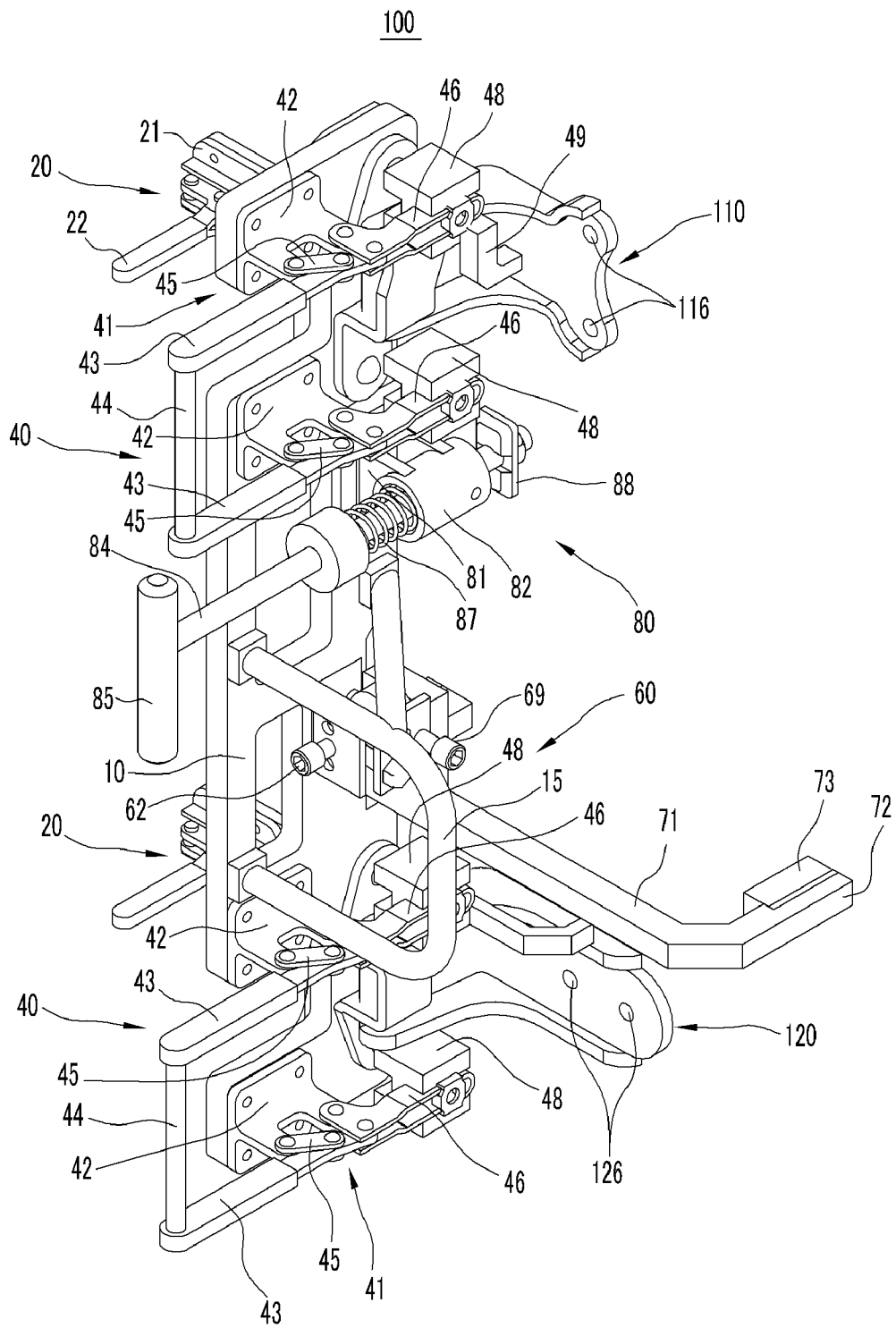
FIG. 2 is a view showing a door hinge set on a door hinge mounting device according to an exemplary embodiment of the present invention.

FIG. 1 is a perspective view of a door hinge mounting device according to an exemplary embodiment of the present invention, and FIG. 2 is a view showing a door hinge set on a door hinge mounting device according to an exemplary embodiment of the present invention.

Referring to the drawings, a door hinge mounting device 100 according to an exemplary embodiment of the present invention is a device for mounting a door hinge 110 to a vehicle body in a vehicle manufacturing line.

The mounting device 100 according to an exemplary embodiment of the present invention can mount the door hinge 110 to a vehicle body based on a vehicle body rather than a jig.

In the door hinge mounting device 100, constituent elements, which will be explained later, are provided to a jig frame 10.

The jig frame 10 includes a bracket, a block, and so on to support the constituent elements.

The term jig frame 10 is used herein to be inclusive of such constituent elements, otherwise indicated.

Figure 3:
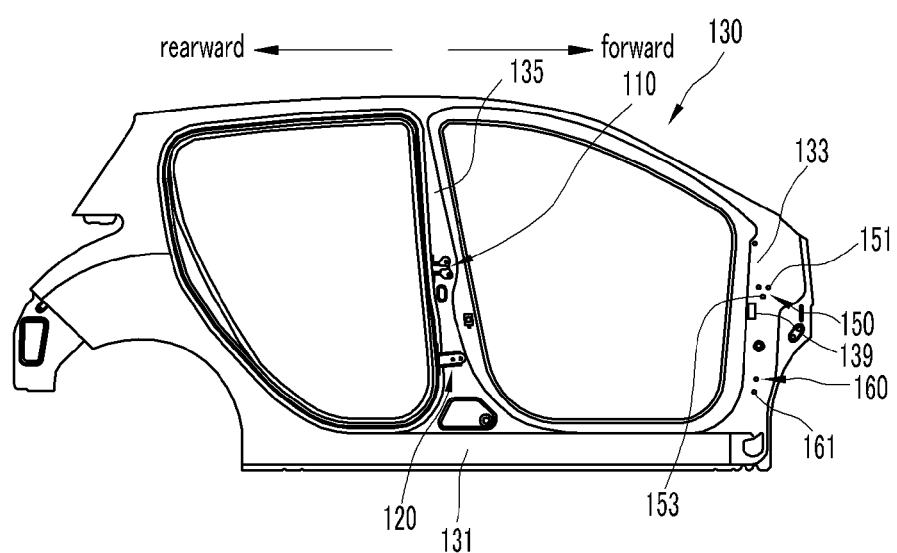
FIG. 3 is a front view showing a vehicle body where a door hinge mounting device is applied according to an exemplary embodiment of the present invention.

FIG. 3 is a front view showing a vehicle body where a door hinge mounting device is applied according to an exemplary embodiment of the present invention.

Referring to the drawing, a vehicle body 130 to which the door hinge mounting device 100 is applied is provided with a side outer panel 131.

A forward pillar 133 and a rearward pillar 135 where a front door and a rear door (not shown) are respectively mounted are formed to the side outer panel 131.

Door hinge mounting portions 150 and 160 for mounting the door hinges 110 are formed to upper and lower sides of each pillar 133 and 135.

Solely for the purpose of simplicity, the door hinge mounting portions 150 and 160 for the rearward pillar 135 are omitted in the drawing.

A pair of vehicle body bolt holes 151 are formed to each door hinge mounting portion 150 for mounting the door hinges 110.

Hereinafter, the door hinge mounting portion 150 that is formed at the upper side of each pillar 133 and 135 will be indicated as an "upper door hinge mounting portion", and the other will be indicated as a "lower door hinge mounting portion".

It is, however, to be noted that the schemes of "the door hinge mounting portion" and "the lower door hinge mounting portion" may be reversed.

A positioning hole 153 is formed between vehicle body bolt holes 151 in the upper door hinge mounting portion 150.

The positioning hole 153 determines a position of the door hinge 110 in the upper door hinge mounting portion 150.

A slot hole 139 for fixing the mounting device 100 to the side outer panel 131 of the vehicle body 130 is formed between the upper door hinge mounting portion 150 and the lower door hinge mounting portion 160.

While the slot hole 139 is shown to be vertically extending in the drawing, it is not limited thereto.

Figure 4A:
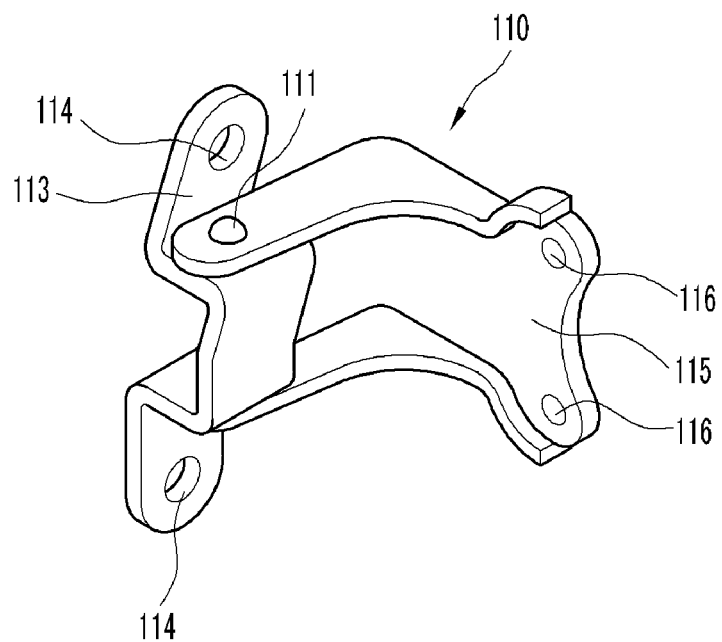
FIG. 4A and FIG. 4B show door hinges according to an exemplary embodiment of the present invention.
Figure 4B:
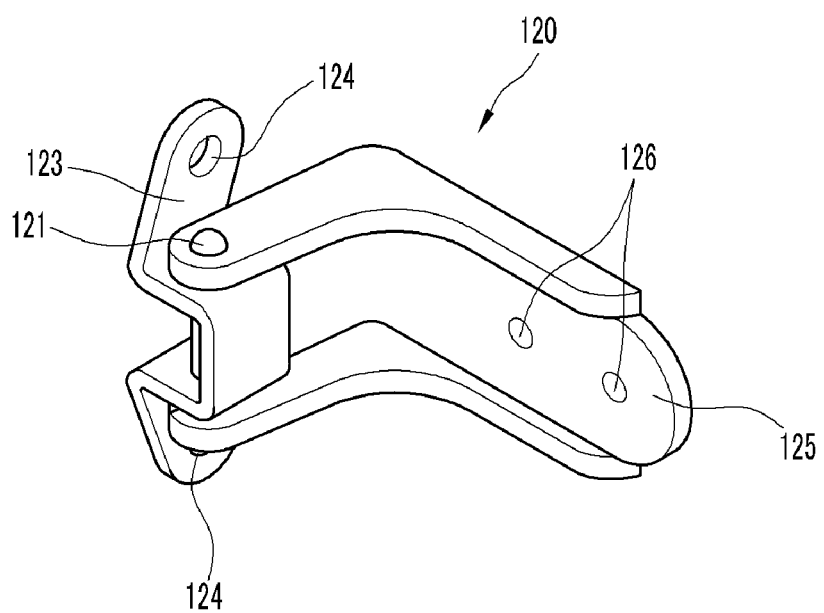

FIG. 4A and FIG. 4B show door hinges according to an exemplary embodiment of the present invention.

A door hinge 110 as shown in FIG. 4A is mounted to the upper door hinge mounting portion 150, and a door hinge 120 as shown in FIG. 4B is mounted to the lower door hinge mounting portion 160.

The door hinges 110 and 120 respectively include door hinge plates 113 and 123 and vehicle body hinge plates 115 and 125, which are hingedly connected by hinge pins 111 and 121.

The door hinge plates 113 and 123 are respectively connected to a front door (not shown) by a bolt and are disposed vertically in the upper and lower door hinge mounting portions 150 and 160, and first hinge bolt holes 114 and 124 are formed thereto.

Second hinge bolt holes 116 and 126, which are connected with the vehicle body bolt holes 151 and 161 of the upper and lower door hinge mounting portions 150 and 160, are formed to the vehicle body hinge plates 115 and 125.

In the exemplary embodiment of the present, the upper and lower door hinges 110 and 120 are the same except for shapes of the vehicle body hinge plates 115 and 125. In modified embodiments, the upper and lower door hinges 110 and 120 may be mounted to the lower door hinge mounting portion 160 and the upper door hinge mounting portion 150, respectively, or one of the upper and lower door hinges 110 and 120 may be selectively mounted to both door hinge mounting portions 150 and 160.

Figure 5A:
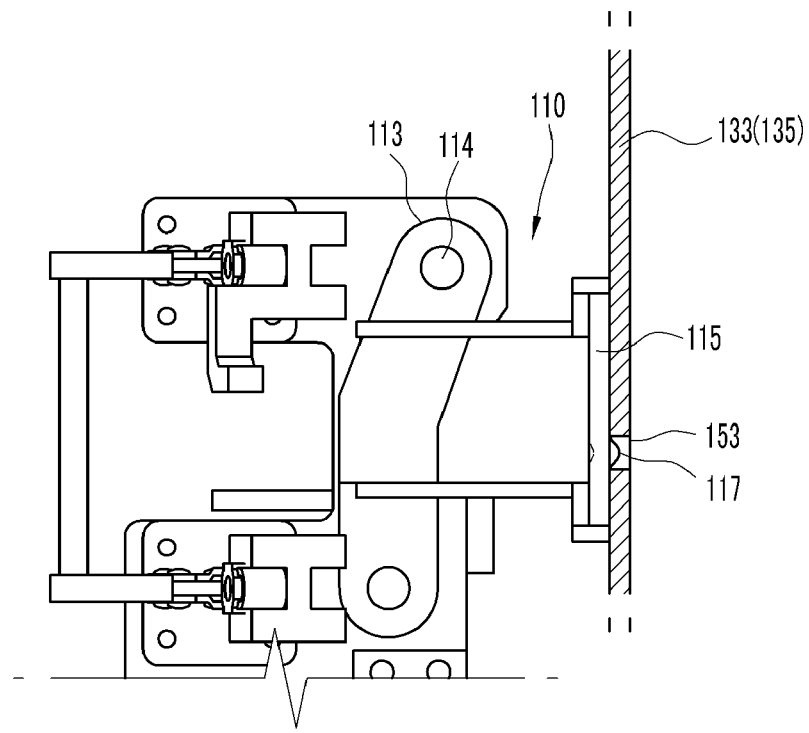
FIG. 5A and FIG. 5B show door hinges mounted to a pillar according to an exemplary embodiment of the present invention.
Figure 5B:
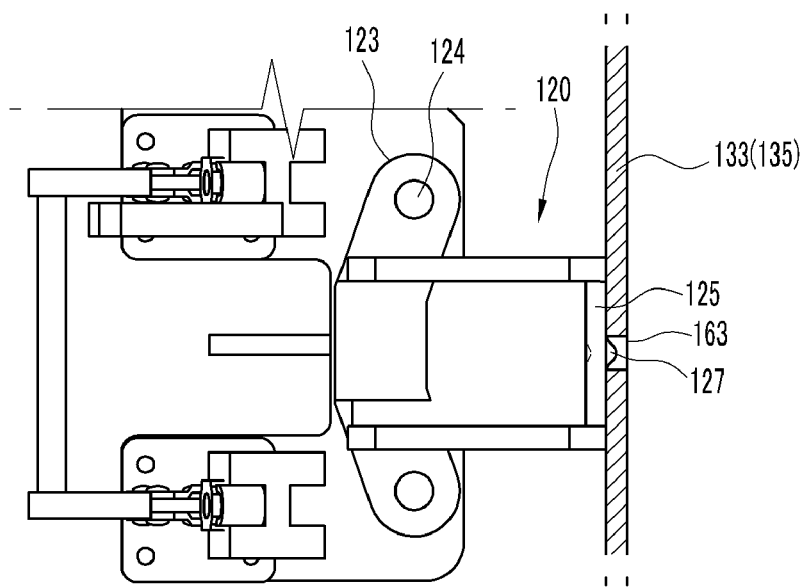

Referring to FIG. 5A and FIG. 5B, mounting of the door hinges 110 and 120 to the door hinge mounting portions 150 and 160 of a forward pillar 133 and rearward pillar 135 is described.

Positioning protrusions 117 and 127 are formed to a side of the body hinge plates 115 and 125 of the door hinges 110 and 120 corresponding to the positions of the door hinge mounting portions 150 and 160.

The positioning protrusions 117 and 127 can be inserted into the positioning holes 153 and 163 of the door hinge mounting portions 150 and 160.

Hereinafter, the door hinge mounting device 100 according to the exemplary embodiment of the present invention will be explained referring to the drawings.

Referring to FIGS. 1 and 2, the door hinge mounting device 100 includes upper and lower door hinge arranging units 20, upper and lower door hinge clamping units 40, a support unit 60, and a fixing unit 80, which are mounted to the jig frame 10.

The upper and lower door hinge arranging units 20 have the same structural elements except for the positions. Likewise, the upper and lower door hinge clamping units 40 have the same structural elements except for the positions.

Thus, the same reference numbers are used for the elements of the upper and lower door hinge arranging units, and the same reference numbers are used for the elements of the upper and lower door hinge clamping units.

The upper and lower door hinge arranging units 20 arrange the upper and lower door hinges 110 to the jig frame 10.

The upper and lower door hinge arranging units 20 are respectively disposed to upper and lower rearward sides of the jig frame 10 corresponding to positions of the upper and lower door hinge mounting portions 150 and 160 of each pillar 133 and 135.

As described above, the upper door hinge arranging unit 20 arranges the upper door hinge 110 by inserting the positioning protrusion 117 of the vehicle body hinge plate 115 into the positioning hole 153 formed to the upper door hinge mounting portion 150 of each pillar 133 and 135.

The jig frame 10 is preferably a plate-type frame, which is formed vertically according to the upper and lower door hinge mounting portions 150 and 160 of each pillar 133 and 135.

A grip 15 is formed to the rearward side of the jig frame 10 for a worker to grip and move the jig frame 10.

Figure 6:
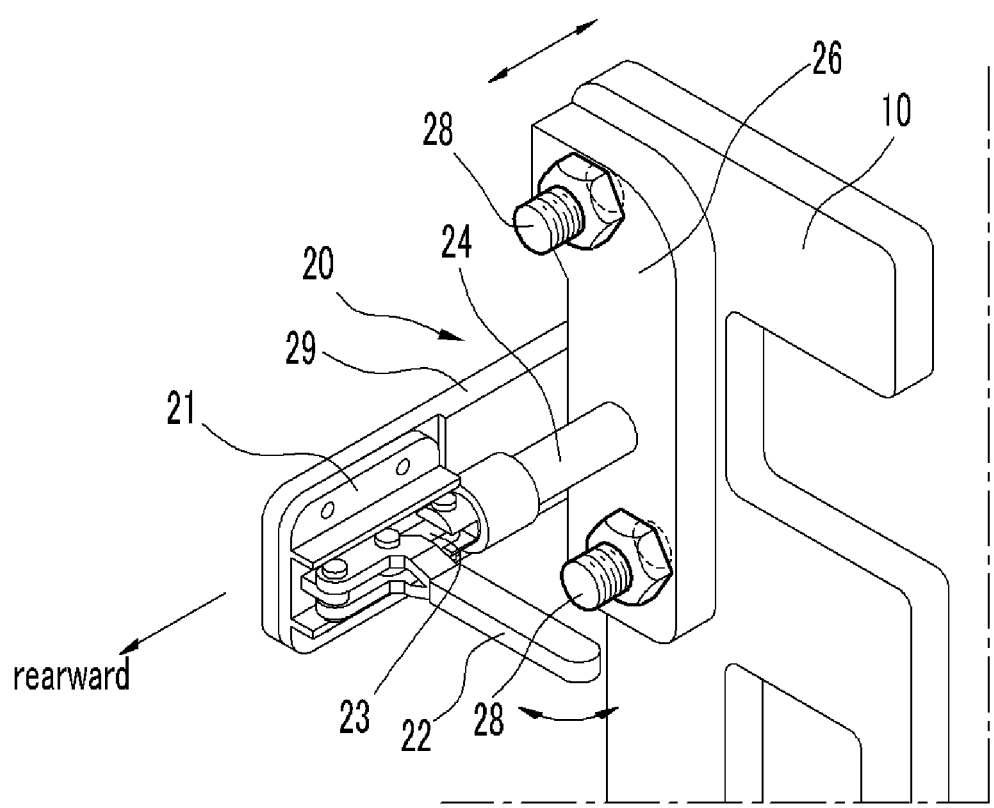
FIG. 6 is a perspective view of a door hinge arranging unit according to an exemplary embodiment of the present invention.

The upper and lower door hinge arranging units 20 each, as shown in FIG. 6, include a first bracket 21, a first toggle lever 22, a first link 23, an operating rod 24, a moving plate 26, and a pair of arranging pins 28.

The first bracket 21 is disposed to upper and lower rearward sides of the jig frame 10 through a mounting plate 29.

The first toggle lever 22 is hingedly connected with the first bracket 21 so as to be movable forward and rearward of the vehicle body 130.

The first link 23 is hingedly connected with the first toggle lever 22, and the operating rod 24 is hingedly connected with the first link 23.

The operating rod 24 moves forward and rearward of the vehicle body according to hinge movement of the first link 23 by operation of the first toggle lever 22.

The moving plate 26 is connectedly disposed with the operating rod 24 on a side of the jig frame 10.

That is, the moving plate 26 moves forward and rearward of the vehicle body 130 according to forward and rearward movement of the operating rod 24 so that the moving plate 26 contacts the side of the jig frame 10 or is separated from the jig frame 10.

The pair of arranging pins 28 are fixed to the upper and lower sides of the moving plate 26 corresponding to the position of the door hinge plate 113 of the upper and lower door hinges 110 and 120, and the arranging pins 28, which may be tooling pins, can be inserted into the first hinge bolt hole 114 of the door hinge plate 113 of the jig frame 10.

The upper and lower door hinge clamping units 40, as shown FIG. 1 and FIG. 2, clamp the upper and lower door hinges 110 and 120, which are respectively arranged to the upper and lower forward sides of the jig frame 10 by the upper and lower door hinge arranging units 20.

The upper and lower door hinge clamping units 40 are respectively arranged to the upper and lower forward sides of the jig frame 10.

The upper door hinge clamping unit 40 clamps the upper door hinge 110 of which the positioning protrusion 117 is inserted into the positioning hole 153 of the upper door hinge mounting portion 150 of each pillar 133 and 135.

The upper and lower door hinge clamping units 40 each include a toggle clamp 41 that includes a second bracket 42, a second toggle lever 43, a second link 45, a pivoting element 46, and a clamper 48.

In the exemplary embodiment of the present invention, the upper and lower door hinge clamping units 40 respectively include the same constituent elements except mounting positions, so hereinafter the upper door hinge clamping unit 40 will be explained without explanation about the lower door hinge clamping unit 40.

The second bracket 42 is disposed to the upper forward side of the jig frame 10 as two halves corresponding to the position of the door hinge plate 113 of the upper door hinge 110, which is arranged by the upper door hinge arranging unit 20.

That is, the second bracket 42 is disposed to the forward side of the jig frame 10 corresponding to the position of the door hinge plate 113.

The second toggle lever 43 as two units is rotatably connected to the second bracket 42.

The two units of the second toggle lever 43 are connected to each other by a connecting member 44.

The second link 45 is hingedly connected with the second toggle lever 43 and the second bracket 42.

The pivoting element 46 is hingedly connected with the second toggle lever 43 and the second bracket 42.

The clamper 48 is connected with the each pivoting element 46 and clamps upper and lower sides of the door hinge plate 113 of the upper door hinge 110.

Each clamper 48 clamps the upper and lower sides of the door hinge plate 113 based on the first hinge bolt hole 114 of the door hinge plate 113 and the arranging pin 28 of the upper door hinge arranging unit 20, which penetrates the jig frame 10.

The clamper 48, which is disposed to the upper door hinge clamping unit 40, is integrally provided with an arranging protrusion 49, which arranges the vehicle body hinge plate 115 of the upper door hinge 110.

The lower door hinge clamping unit 40 includes the same constituent elements as the upper hinge clamping unit 40 except mounting positions, so explanation of the lower door hinge clamp unit 40 will be omitted.

Referring to FIG. 1 and FIG. 2, the support unit 60 adheres the mounting device 100 to each pillar 133 and 135 of the vehicle body 130.

Figure 7:
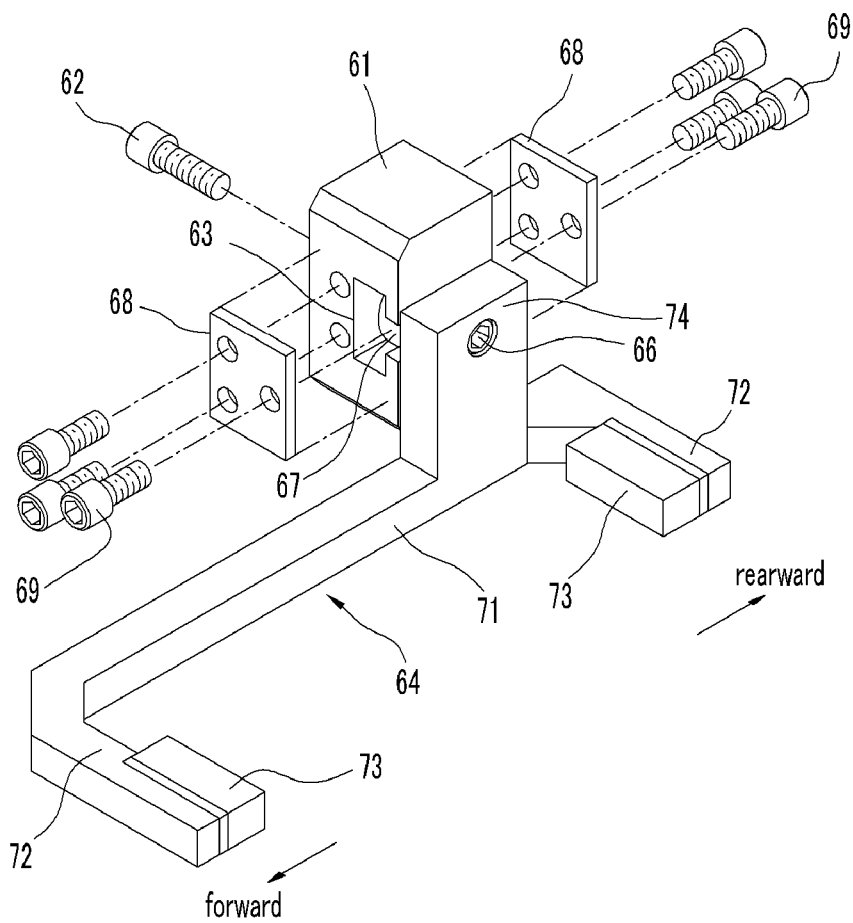
FIG. 7 is an exploded perspective view of a support unit according to an exemplary embodiment of the present invention.

The support unit 60, as shown in FIG. 7, is disposed near the lower door hinge clamping unit 40 of the jig frame 10 and includes a fixing block 61, a location arm 64, a first fixing bolt 62, a circle unit 67, a cover plate 68, and an adjusting bolt 69.

The fixing block 61 is disposed to the forward side of the jig frame 10 corresponding to the position of each pillar 133 and 135 of the vehicle body 130.

A guide groove 63 is formed to the fixing block 61 from the forward side to the rearward side of the vehicle body 130.

A bolt hole (not shown), which is connected with the guide groove 63, is formed to the fixing block 61.

The location arm 64 substantially adheres the mounting device 100 to each pillar 133 and 135 of the vehicle body 130 and is disposed in the guide groove 63, and the location arm 64 may move in the guide groove 63 in forward and rearward directions of the vehicle body 130.

A detailed scheme of the location arm 64 will be explained later.

The first fixing bolt 62 is screwed to the fixing block 61 on the other side of the vehicle body and fixes the location arm 64.

The circle unit 67 is screwed to the location arm 64 by a second fixing bolt 66 and is slidably disposed in the guide groove 63.

The location arm 64 is connected with the circle unit 67, and the circle unit 67 is slidably disposed in the guide groove 63 so that the location arm 64 may move in the guide groove 63 in forward and rearward directions of the vehicle body 130.

The cover plate 68 is screwed to the fixing block 61 for covering the guide groove 63.

The adjusting bolt 69 is screwed to the cover plate 68 and adjusts a position of the circle unit 67.

The adjusting bolt 69 may be screwed to the cover plate 68 and the jig frame 10.

The location arm 64 includes a longitudinal beam 71, a perpendicular beam 72, a supporting pad 73, and a connecting portion 74.

The longitudinal beam 71 is formed corresponding to each pillar 133 and 135 of the vehicle body 130.

The perpendicular beam 72 is formed to both ends of the longitudinal beam 71 in the direction of the vehicle body 130.

The supporting pad 73 is disposed to each perpendicular beam 72 for matching each pillar 133 and 135, and may be formed of a rubber material.

The connecting portion 74 is eccentrically formed to the longitudinal beam 71 and it is preferably disposed near the rearward part of the vehicle body 130.

The connecting portion 74 is connected with the circle unit 67 by the second fixing bolt 66.

When each pillar 133 and 135 is disposed between each perpendicular beam 72 of the location arm 64 and the first fixing bolt 62 and the adjusting bolt 69 are released, the location arm 64 inclines and each pillar 133 and 135 is closely adhered to the mounting device 100.

When the location arm 64 inclines and the position of the location arm 64 is adjusted in the guide groove 63 of the fixing block 61, the supporting pad 73 and each pillar 133 and 135 are closely adhered.

Because the location arm 64 can be inclined and the supporting pad 73 and each pillar 133 and 135 can be closely adhered, inclined angles between the jig frame 10 and the upper door hinge 110 may be supplemented.

Figure 8:
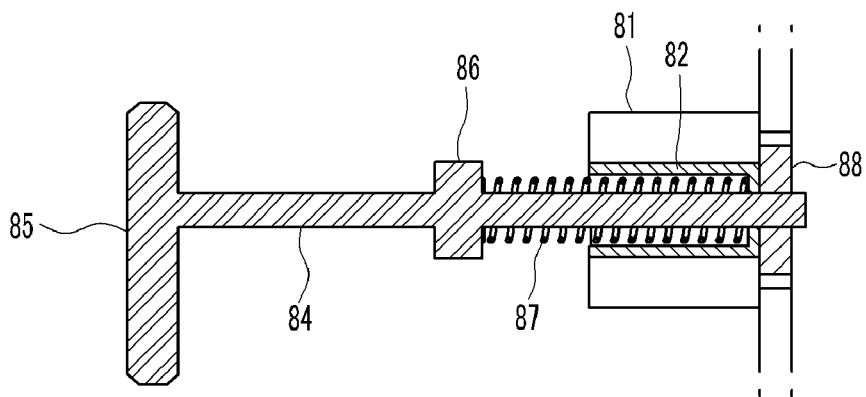
FIG. 8 is a cross-sectional view showing a fixing unit according to an exemplary embodiment of the present invention.

Referring to FIG. 1, FIG. 2, and FIG. 8, the upper and lower door hinge arranging units 20 arrange the upper and lower door hinges 110 and 120, the upper and lower door hinge clamping units 40 clamp the upper and lower door hinges 110 and 120, the support unit 60 adheres the mounting device 100 to the vehicle body 130, and the fixing unit 80 fixes the jig frame 10 to the vehicle body 130.

The fixing unit 80 is disposed to the forward side of the jig frame 10 between the upper door hinge clamping unit 40 and the support unit 60.

The fixing unit 80, as shown in FIG. 8, includes a holder 81, a shaft 84, a spring 87, and a fixing plate 88.

The holder 81 is disposed to the forward side of the jig frame 10 corresponding to the slot hole 139 of the vehicle body 130.

A hollow 82 is formed toward to the slot hole 139 in the holder 81.

The shaft 84 is rotatably disposed in the hollow 82 and can be inserted into the fixing plate 88.

A gripping lever 85 is integrally formed to an end of the shaft 84, and a supporting protrusion 86 is formed on the shaft 84.

The spring 87 may be a compression coil spring and supplies elastic force to the shaft 84, which is disposed in the hollow 82.

The spring 87 is disposed within the hollow 82 and supplies elastic force to the shaft 84 through the supporting protrusion 86.

The fixing plate 88 is connected with the other end of the shaft 84, which is supplied the elastic force from the spring 87.

The fixing plate 88 can be inserted into the slot hole 139 (shown in FIG. 3) of the vehicle body 130 and is closely adhered to the hollow 82. In the drawing, while the fixing plate 88 is a rectangle, it is not limited to this shape, but on the contrary is intended to cover various modifications.

Hereinafter, an operation of the door hinge mounting device 100 according to the exemplary embodiment of the present invention will be explained.

The operation of the door hinge mounting device 100 is achieved when the vehicle body 130 is conveyed by a conveyor system (not shown).

While the operation of the door hinge mounting device 100 is to mount the door hinges 110 and 120 to the upper and lower door hinge mounting portions 150 and 160 of the forward pillar 133 and rearward pillar 135 by using the door hinge mounting device 100, mounting the door hinge 110 to the upper and lower door hinge mounting portions 150 and 160 of the forward pillar 133 will be explained for convenience.

Figure 9A:
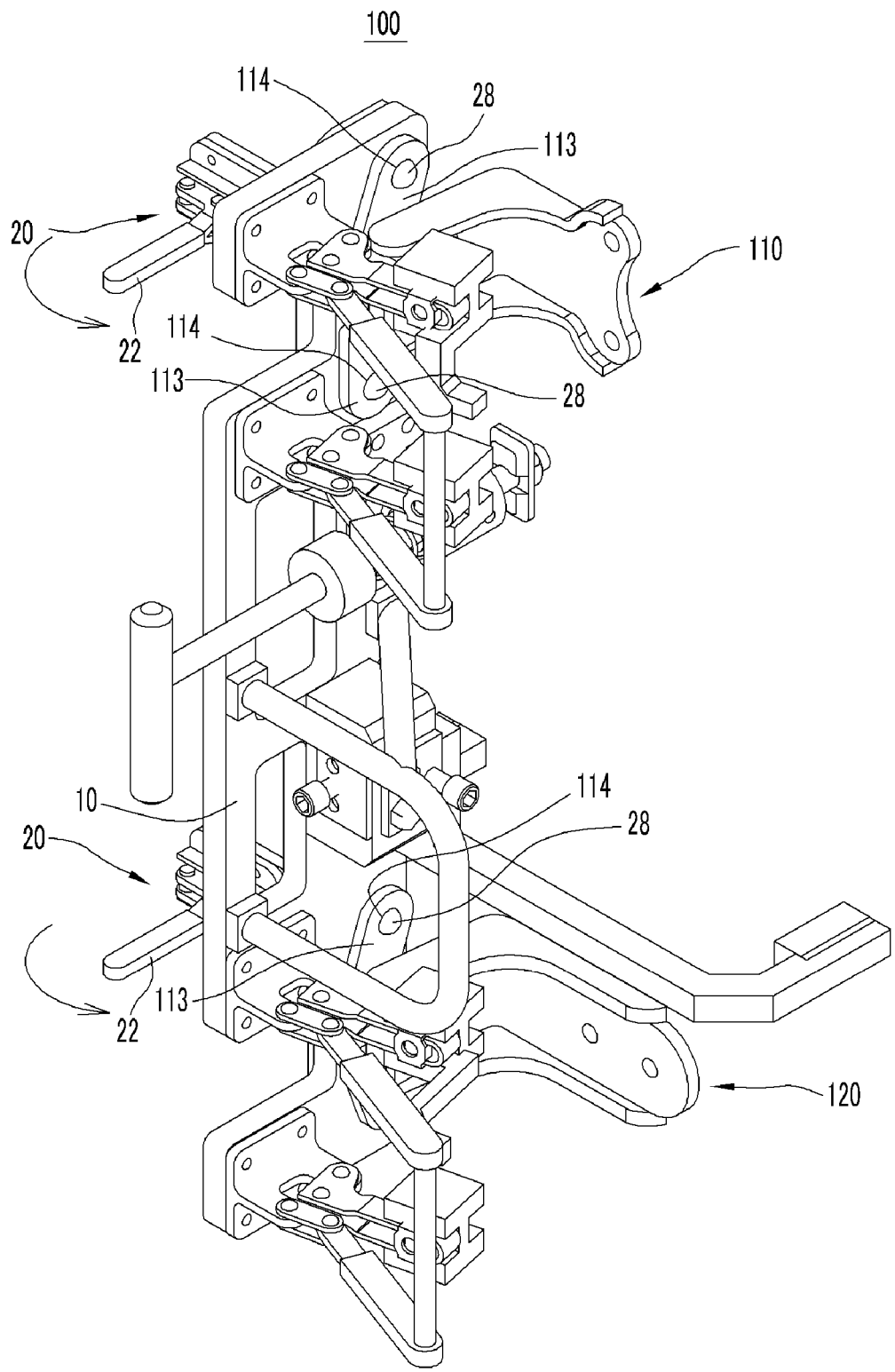
FIG. 9A to FIG. 9E are perspective views explaining operations of a door hinge mounting device according to an exemplary embodiment of the present invention.

As shown in FIG. 9A, the first toggle lever 22 of the upper and lower door hinge arranging unit 20 is turned along an arrow direction by a worker.

The operating rod 24 of the upper and lower door hinge arranging units 20, as shown in FIG. 6, is turned by operations of the first toggle lever 22 and the first link 23.

The moving plate 26 of the upper and lower door hinge arranging units 20 is moved together with the operating rod 24 and then contacts the jig frame 10.

When the moving plate 26 contacts the jig frame 10, the arranging pins 28 of the upper and lower door hinge arranging units 20 protrude from the jig frame 10.

The worker then connects the protruded arranging pins 28 with the upper and lower door hinges 110 and 120.

That is, the arranging pins 28 are inserted into the first hinge bolt holes 114 and 124 of the upper and lower door hinges 110 and 120.

Figure 9B:
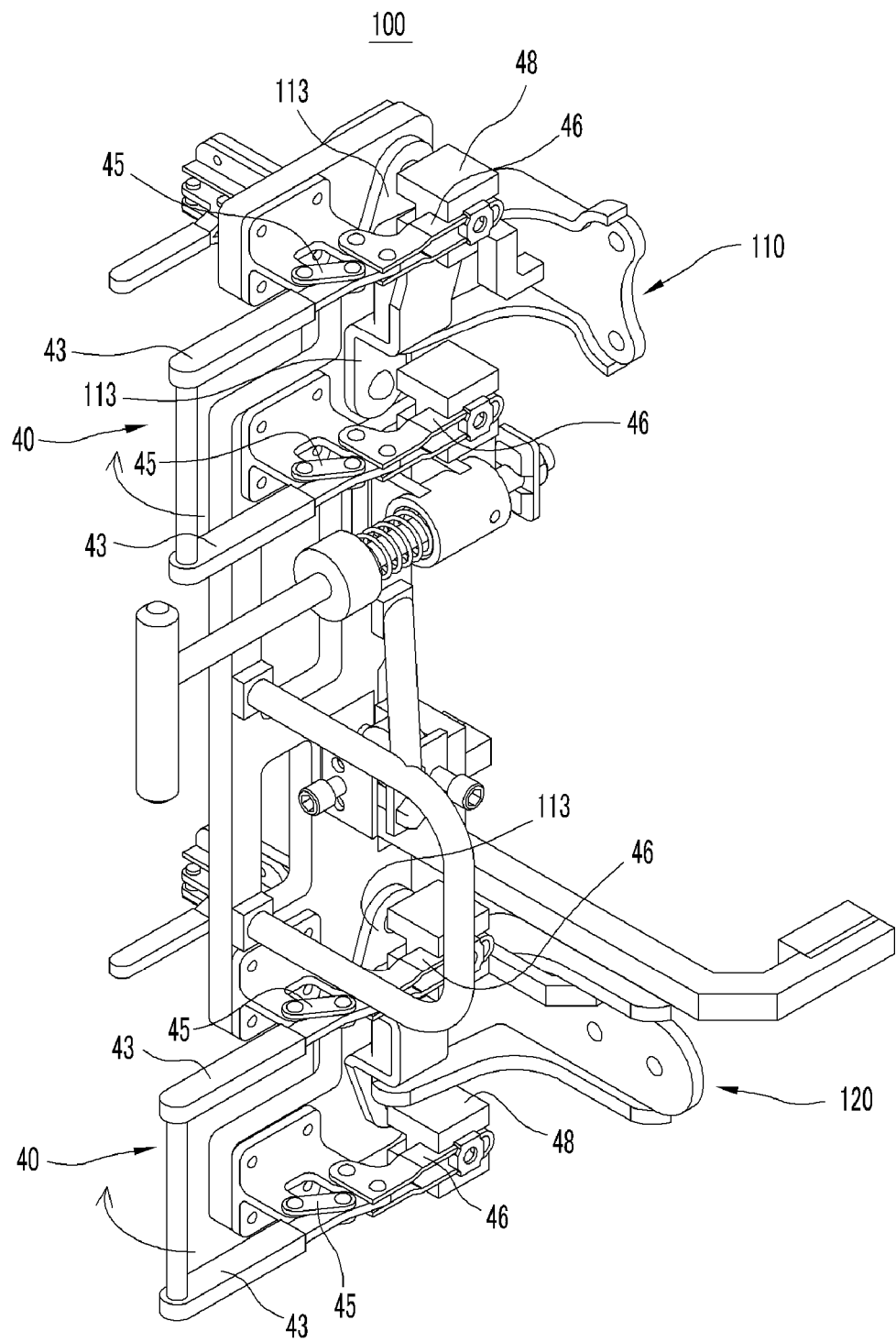

Then, as shown in FIG. 9B, the second toggle lever 43 of the upper and lower door hinge clamping units 40 is turned along an arrow direction.

The clamper 48 clamps the door hinge plate 113 of the upper and lower door hinges 110 and 120 by operations of the second toggle lever 43, the second link 45, and the pivoting element 46.

Figure 9C:
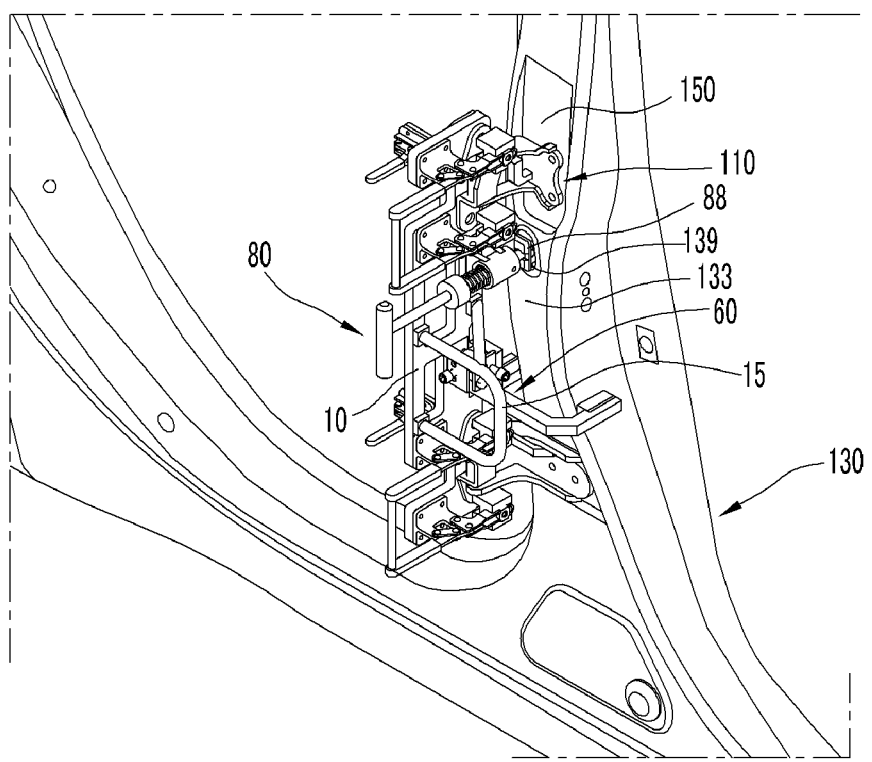

Then, as shown in FIG. 9C, the worker hold the grip 15 to move the jig frame 10 toward the forward pillar 133 of the vehicle body 130.

The positioning protrusion 117 of the upper door hinge 110 is inserted into the positioning hole 153 of the upper door hinge mounting portion 150 (referring to FIGS. 5A and 5B).

When the positioning protrusion 117 of the upper door hinge 110 is inserted into the positioning hole 153 of the upper door hinge mounting portion 150, the position of the positioning protrusion 117 becomes a base position of the forward pillar 133.

Simultaneously, the fixing plate 88 of the fixing unit 80 is matched with the slot hole 139 of the vehicle body 130.

As shown in FIG. 7, the position of the location arm 64 can be adjusted by releasing the first fixing bolt 62 and the adjusting bolt 69 of the support unit 60.

Because the location arm 64 is eccentrically connected to the circle unit 67 through the connecting portion 74, the location arm 64 inclines to be closed to the forward pillar 133 of the vehicle body 130.

The location arm 64 is inclined and the supporting pad 73 and the forward pillar 133 are closely adhered, so that the inclined angles between the jig frame 10 and the upper door hinge 110 are supplemented.

The jig frame 10 is precisely arranged to the upper door hinge 110 and then the lower door hinge 110 arranged by the lower door hinge arranging unit 20 is set to the lower door hinge mounting portion 150 of the forward pillar 133.

That is, the second hinge bolt hole 126 of the vehicle body hinge plate 125 of the lower door hinge 120 is positioned to the vehicle body bolt hole 161 of the lower door hinge mounting portion 160.

Figure 9D:
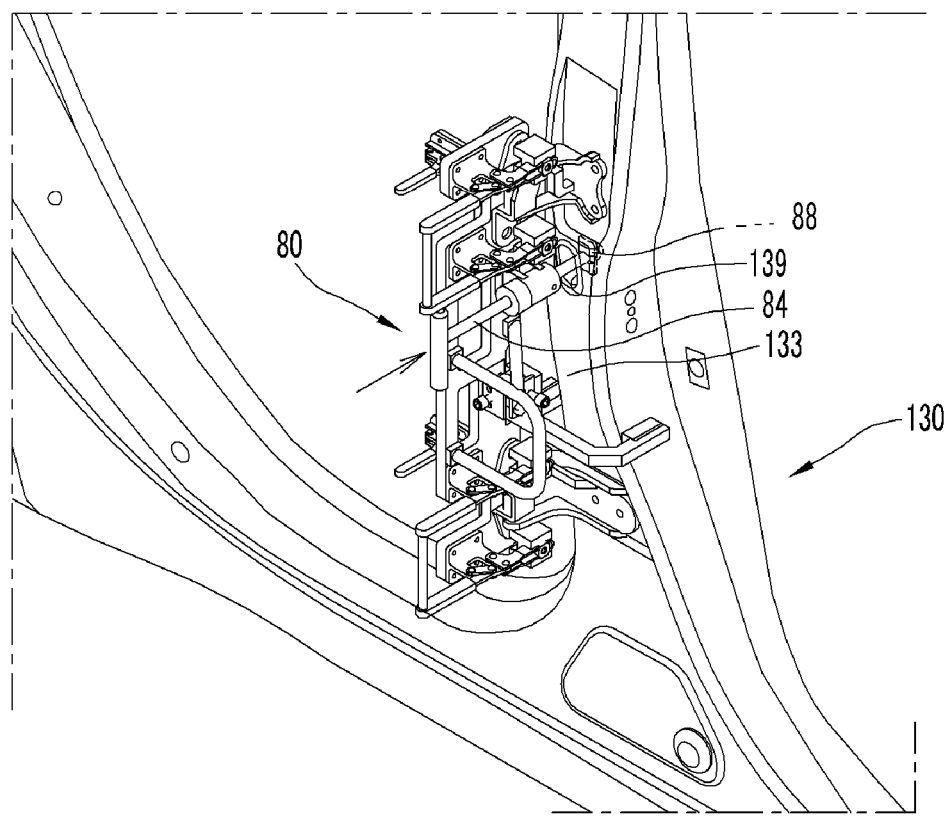

Then, as shown in FIG. 9D, the worker pushes the shaft 84 of the fixing unit 80 to the vehicle body 130.

The shaft 84, as shown in FIG. 8, can be inserted into the forward pillar 133 through the slot hole 139 of the vehicle body 130 overcoming the elastic force of the spring 87.

Figure 9E:
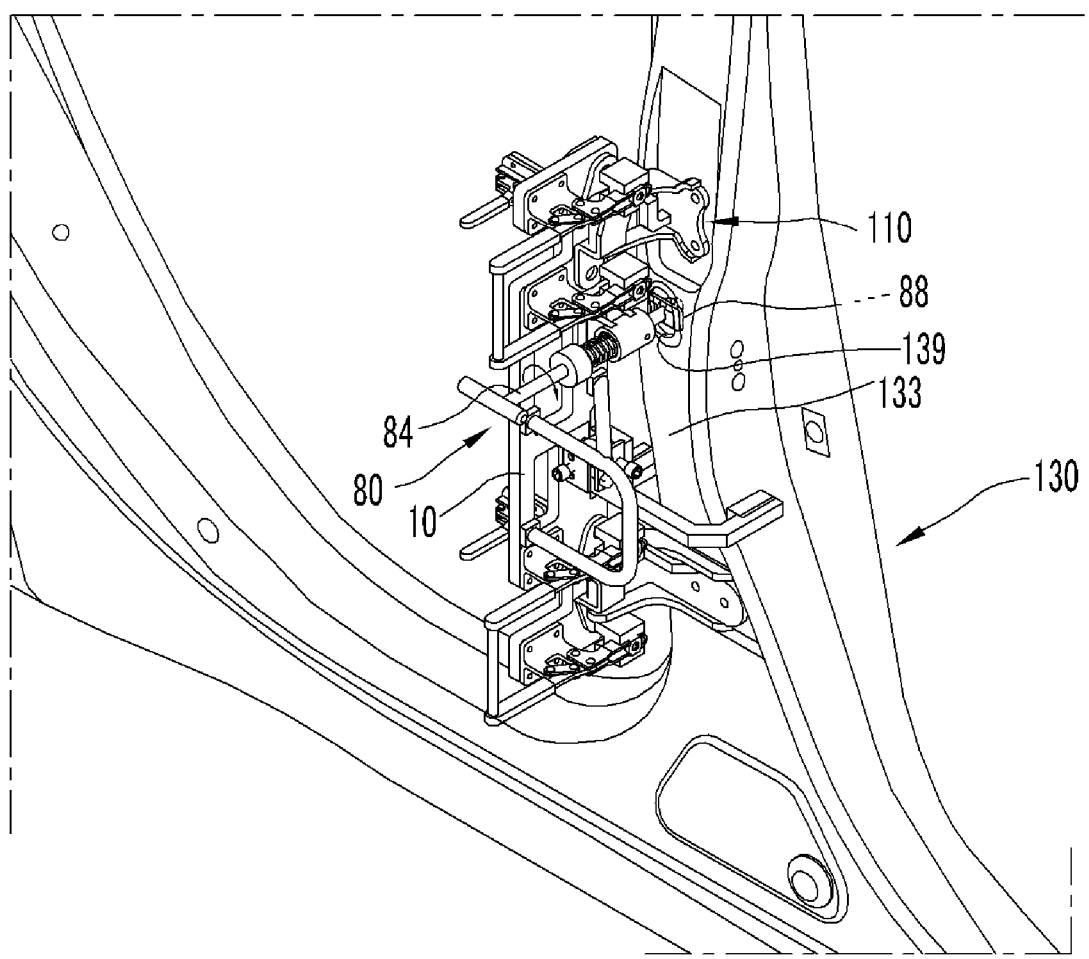

Then, the worker turns the shaft 84 along an arrow direction as shown in FIG. 9E. At the same time, the fixing plate 88 is turned with the shaft 84 inside the forward pillar 133.

When a pressure supplied to the shaft 84 is released, the shaft moves backward by the elastic restoring force of the spring 87 (referring to FIG. 8).

The fixing plate 88 is caught by an edge of the slot hole 139 within the forward pillar 133 and fixed to the edge of the slot hole 139 by the elastic restoring force.

That is, the fixing plate 88 is fixed to the edge of the slot hole 139 by the elastic restoring force of the spring 87 within the forward pillar 133 so that the jig frame 10 is strongly fixed to the forward pillar 133 of the vehicle body 130.

Using the processes described above, the upper and lower door hinges 110 and 120 can be set to the forward pillar 133 of the vehicle body 130.

After setting the upper and lower door hinges 110 and 120 to the forward pillar 133, the second hinge bolt holes 116 and 126 of the vehicle body hinge plate 115 and 125 of the upper and lower door hinges 110 and 120 are screwed to the vehicle body 130 so that the mounting processes for the upper and lower door hinges 110 and 120 is completed.

Then the worker releases the fixing unit 80, the support unit 60, the upper and lower door hinge clamping units 40, and the upper and lower door hinge arranging units 20 in the order which is the reverse order of the above-described process.

Then, the door hinge mounting device 100 according to the exemplary embodiment of the present can be separated from the vehicle body 130.

As described above, the mounting device 100 can mount the door hinges 110 and 120 to upper and lower door hinge mounting portions 150 and 160 of each pillar 133 and 135 based on the vehicle body 130.

The positioning protrusion 117 of the upper door hinge 110 can be a base position for mounting the upper door hinge 110 to the upper door hinge mounting portion 150 of each pillar 133 and 135, and the support unit 60 can arrange the lower door hinge 120 to the lower door hinge mounting portion 160 of each pillar 133 and 135.

Thus, the mounting device 100 according to the exemplary embodiment of the present can precisely mount the door hinges 110 and 120 to upper and lower door hinge mounting portions 150 and 160 of each pillar 133 and 135 so that a tolerance can be minimized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A door hinge mounting device comprising:
a jig frame;
upper and lower door hinge arranging units disposed to a rearward side of the jig frame corresponding to positions of hinge mounting portions of a vehicle body for arranging upper and lower door hinges;
upper and lower door hinge clamping units disposed to a forward side of the jig frame corresponding to positions of the upper and lower door hinge arranging units for clamping the door hinges;
a support unit disposed near the lower door hinge clamping unit for closely adhering the jig frame to the vehicle body; and
a fixing unit disposed to the forward side of the jig frame between the upper door hinge clamping unit and the support unit for fixing the jig frame to the vehicle body, wherein the fixing unit comprises:
a holder that comprises a hollow and is disposed forward to the jig frame;
a shaft that is rotatably disposed in the hollow and comprises a lever that is formed to an end of the shaft and a supporting protrusion that is formed the shaft;
a spring disposed in the hollow and supplying elastic force to the supporting protrusion; and
a fixing plate that is formed to the other end of the shaft and is selectively inserted into a slot hole that is formed to the vehicle body.

2. The door hinge mounting device of claim 1, wherein the upper door arranging unit is configured such that a positioning protrusion formed to a vehicle body hinge plate of the upper door hinge can be inserted to a positioning hole formed to the door hinge mounting portion for arranging the upper door hinge.

3. The door hinge mounting device of claim 2, wherein, the positioning protrusion inserted into the positioning hole acts as reference position of the jig frame for the vehicle body.

4. The door hinge mounting device of claim 1, wherein the fixing unit comprises:
a holder that comprises a hollow and is disposed forward to the jig frame;
a shaft that is rotatably disposed in the hollow and comprises a lever that is formed to an end of the shaft and a supporting protrusion that is formed the shaft;
a spring disposed in the hollow and supplying elastic force to the supporting protrusion; and
a fixing plate that is formed to the other end of the shaft and is selectively inserted into a slot hole that is formed to the vehicle body.

5. The door hinge mounting device of claim 1, wherein the support unit comprises:
a fixing block disposed forward to the jig frame corresponding to a position of a pillar of the vehicle body;
a location arm that is movably disposed to the fixing block to forward and rearward of the vehicle body and adhered closely to the pillar of the vehicle body; and
a first fixing bolt that is screwed to the fixing block for fixing the location arm.

6. The door hinge mounting device of claim 5, wherein the support unit further comprises:
a circle unit that is connected to the location arm and is slidably disposed within a guide groove that is formed in the fixing block;
a cover plate for covering the guide groove; and
an adjusting bolt that is screwed with the cover plate and adjusts a position of the circle unit.

7. The door hinge mounting device of claim 6, wherein the location arm comprises:
a longitudinal beam that is formed along the front and rear of the vehicle body corresponding to the pillar;
a perpendicular beam formed to both ends of the longitudinal beam; and
a supporting pad mounted to the perpendicular beam corresponding to the pillar.

8. The door hinge mounting device of claim 7, wherein a connecting portion is eccentrically disposed to the longitudinal beam and connected with the circle unit by a second fixing bolt.

9. The door hinge mounting device of claim 1, wherein the upper and lower door hinge arranging units each comprise:
first brackets that are mounted to upper and lower sides of the jig frame;
a first toggle lever that is hingedly connected to each of the first brackets;
a first link that is hingedly connected to the first toggle lever;
an operating rod that is hingedly connected to the first link and moves forward and rearward of the vehicle body according to an operation of the first toggle lever;
a moving plate connected with the operating rod; and
an arranging pin that is mounted to the moving plate and can be inserted into a bolt hole, which is formed to a door hinge plate, through the jig frame.

10. The door hinge mounting device of claim 1, wherein each of the upper and lower door hinge clamping units is a toggle clamp.

11. The door hinge mounting device of claim 1, wherein the upper and lower door hinge clamping units each comprises:
second brackets that are mounted to upper and lower forward sides of the jig frame corresponding to the door hinge plates arranged by the door hinge arranging units;
second toggle levers that are rotatably connected with the second brackets and connected to each other by a connecting member;
a second link that is hingedly connected to each of the second toggle levers and each of the second brackets;

a pivoting element that is hingedly connected to each of the second toggle levers and each of the second brackets; and a clamper that is connected with the pivoting element for clamping a corresponding door hinge plate.

12. The door hinge mounting device of claim 11, wherein the clamper clamps the door hinge plate with the bolt hole center centered.

13. The door hinge mounting device of claim 12, wherein an arranging protrusion is formed to the clamper for clamping the vehicle body hinge plate.

14. The door hinge mounting device of claim 1, wherein a grip is mounted to the jig frame.

15. The door hinge mounting device of claim 1, wherein the upper hinge clamping unit is configured such that a positioning protrusion formed to a vehicle body hinge plate corresponding to the upper door hinge mounting portion can be inserted into a positioning hole formed to the door hinge mounting portion for clamping the upper door hinge.

16. The door hinge mounting device of claim 15, wherein the positioning protrusion inserted into the positioning hole acts as reference position of the jig frame for the vehicle body.

17. A door hinge mounting device comprising:
a jig frame;
upper and lower door hinge arranging units disposed to a rearward side of the jig frame corresponding to positions of hinge mounting portions of a vehicle body for arranging upper and lower door hinges;
upper and lower door hinge clamping units disposed to a forward side of the jig frame corresponding to positions of the upper and lower door hinge arranging units for clamping the door hinges;
a support unit disposed near the lower door hinge clamping unit for closely adhering the jig frame to the vehicle body; and
a fixing unit disposed to the forward side of the jig frame between the upper door hinge clamping unit and the support unit for fixing the jig frame to the vehicle body,
wherein the support unit comprises:
a fixing block disposed forward to the jig frame corresponding to a position of a pillar of the vehicle body;
a location arm that is movably disposed to the fixing block to forward and rearward of the vehicle body and adhered closely to the pillar of the vehicle body; and
a first fixing bolt that is screwed to the fixing block for fixing the location arm.

18. The door hinge mounting device of claim 17, wherein the support unit further comprises:
a circle unit that is connected to the location arm and is slidably disposed within a guide groove that is formed in the fixing block;
a cover plate for covering the guide groove; and
an adjusting bolt that is screwed with the cover plate and adjusts a position of the circle unit.

19. A door hinge mounting device comprising:
a jig frame;
upper and lower door hinge arranging units disposed to a rearward side of the jig frame corresponding to positions of hinge mounting portions of a vehicle body for arranging upper and lower door hinges;
upper and lower door hinge clamping units disposed to a forward side of the jig frame corresponding to positions of the upper and lower door hinge arranging units for clamping the door hinges;
a support unit disposed near the lower door hinge clamping unit for closely adhering the jig frame to the vehicle body; and
a fixing unit disposed to the forward side of the jig frame between the upper door hinge clamping unit and the support unit for fixing the jig frame to the vehicle body,
wherein the upper and lower door hinge clamping units each comprises:
second brackets that are mounted to upper and lower forward sides of the jig frame corresponding to the door hinge plates arranged by the door hinge arranging units;
second toggle levers that are rotatably connected with the second brackets and connected to each other by a connecting member;
a second link that is hingedly connected to each of the second toggle levers and each of the second brackets;
a pivoting element that is hingedly connected to each of the second toggle levers and each of the second brackets; and
a clamper that is connected with the pivoting element for clamping a corresponding door hinge plate.

20. The door hinge mounting device of claim 19, wherein the clamper clamps the door hinge plate with the bolt hole center centered.

* * * * *